United States Patent
Mei et al.

(10) Patent No.: US 9,355,320 B2
(45) Date of Patent: May 31, 2016

(54) BLUR OBJECT TRACKER USING GROUP LASSO METHOD AND APPARATUS

(71) Applicant: Toyota Motor Engineering & Manufacturing North America, Inc., Erlanger, KY (US)

(72) Inventors: Xue Mei, Ann Arbor, MI (US); Yi Wu, Nanjiang (CN); Danil V. Prokhorov, Canton, MI (US); Haibin Ling, Cherry Hill, NJ (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/528,528

(22) Filed: Oct. 30, 2014

(65) Prior Publication Data
US 2016/0125249 A1 May 5, 2016

(51) Int. Cl.
*G06K 9/00* (2006.01)
*G06K 9/46* (2006.01)
*G06T 5/00* (2006.01)

(52) U.S. Cl.
CPC .......... *G06K 9/00791* (2013.01); *G06K 9/4642* (2013.01); *G06T 5/002* (2013.01); *G06K 2209/21* (2013.01); *G06T 2207/10016* (2013.01)

(58) Field of Classification Search
None
See application file for complete search history.

(56) References Cited

U.S. PATENT DOCUMENTS

| | | | | |
|---|---|---|---|---|
| 2005/0069173 | A1* | 3/2005 | Morisada | G06K 9/00664 382/103 |
| 2008/0240497 | A1* | 10/2008 | Porikli | G06T 7/20 382/103 |
| 2010/0177194 | A1* | 7/2010 | Huang | 348/157 |
| 2011/0096180 | A1* | 4/2011 | McCloskey | G06T 5/003 348/208.4 |
| 2012/0099765 | A1* | 4/2012 | Zheng | G06K 9/00771 382/103 |
| 2014/0307917 | A1* | 10/2014 | Mei | G06K 9/00771 382/103 |
| 2014/0334720 | A1* | 11/2014 | Shibata | G06T 5/003 382/159 |
| 2015/0178943 | A1* | 6/2015 | Li | G06K 9/00624 382/103 |

OTHER PUBLICATIONS

Wu et al ("Blurred target tracking by blur-driven tracker", 2011).*
Wang et al., "Online Object Tracking with Sparse Prototypes", undated, 12 pages.
Mei et al., "Robust Visual Tracking and Vehicle Classification via Sparse Representation", undated, 14 pages.
Wu et al., "Blurred Target Tracking by Blur-driven Tracker", undated, 8 pages.
Roth et al., "The Group-Lasso for Generalized Linear Models: Uniqueness of Solutions and Efficient Algorithms", undated, 8 pages.

* cited by examiner

*Primary Examiner* — Avinash Yentrapati
(74) *Attorney, Agent, or Firm* — Christopher G. Darrow; Darrow Mustafa PC

(57) ABSTRACT

A method and apparatus for tracking an object across a plurality of sequential images, where certain of the images contain motion blur. A plurality of normal templates of a clear target object image and a plurality of blur templates of the target object are generated. In the next subsequent image frame, a plurality of bounding boxes are generated of potential object tracking positions about the target object location in the preceding image frame. For each bounding box image frame, a reconstruction error is generated that one bounding box has a maximum probability that it is the object tracking result in the subsequent image frame.

12 Claims, 4 Drawing Sheets

BLUR OBJECT TRACKER USING GROUP LASSO METHOD AND APPARATUS

BACKGROUND

The present disclosure relates, in general, to object detection and tracking methods and apparatus.

Vehicle safety is deemed enhanced by computer and sensor based systems, which detect objects, such as vehicles, pedestrians, as well as stationary poles, and signs which may be in the path of a moving vehicle and could result in a collision.

Autonomous driverless vehicles are also being proposed. Such autonomous vehicles require a current view of surrounding objects, such as vehicles, poles, pedestrians, etc., which may be moving or stationary relative to the moving vehicle.

In order to implement the vehicle based collision and based warning accurately, and in order to avoidance systems as well as to implement autonomous driverless vehicles, facial resignation, etc., object detection and tracking methods have been proposed.

SUMMARY

The present disclosure describes a method and an apparatus for tracking an object across a plurality of sequential image frames, where certain of the image frames contain motion blur.

The method and apparatus for detecting and tracking objects includes and performs the steps of receiving a video sequence including a plurality of sequential video frames from an image recording device, and selecting a clear target object image in one video frame. At least one normal template and a plurality of blur templates are created from the clear target object.

Next, a plurality of bounding boxes are generated in the next subsequent image frame around the location of the target object in the preceding frame and defining potential object tracking positions. For each bounding box in a subsequent image frame, a reconstruction error is generated showing one bounding box that has a maximum probability that it is the object tracking result.

The method and apparatus create the first normal template of an unblurred object in the target box, and create the different blur templates of the target box by convolving the target box with different kernels. After the method and apparatus generate the plurality of bounding boxes in the next frame about the target in the preceding frame, a gradient histogram is calculated for each bounding box in each sequential frame. The distance of the target candidate from each normal and blur templates are calculated. The method and apparatus measure a sum of weighted distance and a loss function.

Next, the method and apparatus divide the templates into separate groups of normal templates; blur templates toward the same direction of motion, and trivial templates. The method and apparatus use a structured sparsity-inducing norm which combines the L1 norm and the sum of L1/L2 norms over groups of variables. When the loss function and the sum of the L1 norm+L1/L2 mixed norm are combined into a non-smooth convex optimization problem, the method and apparatus solve the non-smooth convex optimization problem to derive an observation likelihood from a reconstruction error of the location of the object being tracked in the current image frame.

BRIEF DESCRIPTION OF THE DRAWING

The various features, advantages and other uses of the blur object tracking method and apparatus will become more apparent by referring to the following detailed description and drawing in which.

DETAILED DESCRIPTION

Figure 1:
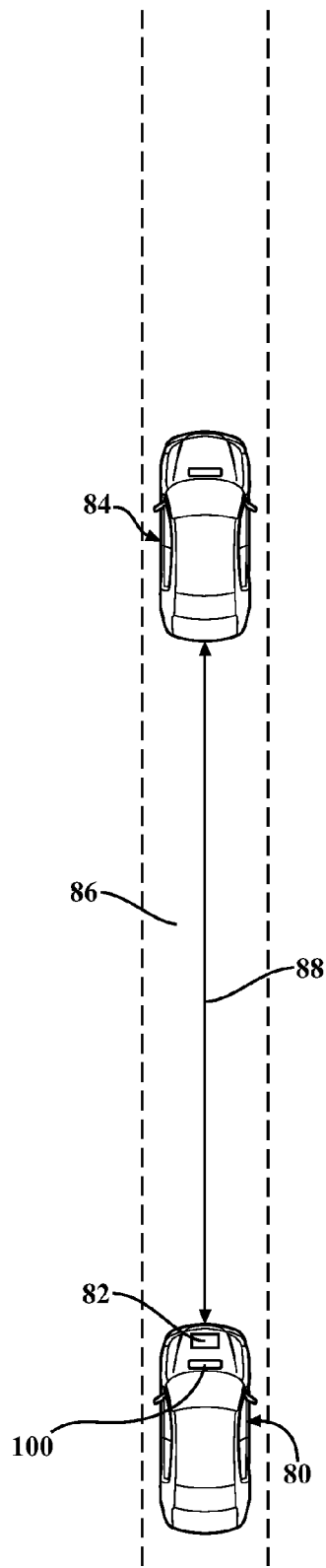
FIG. 1 is a pictorial representation of the present method and apparatus tracking a detected vehicle in the path of the moving vehicle.

Referring now to the drawing, and to FIGS. 1-5 in particular, there is depicted an object tracking apparatus useful in implementing an object tracking method.

The presently disclosed object tracking method and apparatus uses blur templates to detect a direction of movement of an object being tracked through a sequential series of images of which may contain blurred images. The method and apparatus uniquely utilize gradient information by calculating gradient histograms for each template. The sum of weighted distance is used to measure a loss function. Group Lasso is imposed on the L1+L1/L2 mixed norms resulting in a non-smooth convex optimization problem, which can be solved to determine the observation likelihood from the reconstruction error of an object position over multiple sequential frames even, when the object image is blurred.

The apparatus, which can be mounted, for example, on a moving vehicle 80, includes an image sensor camera 82. By way of example, the camera 82 may be a high definition video camera with a resolution of 1024 pixels per frame.

The camera 82, in addition to possibly being a high definition camera 82, for example, can also be a big-picture/macro-view (normal or wide angle) or a telephoto camera. Two types of cameras, one having normal video output and the other providing the big-picture/macro-view normal or wide angle or telephoto output, may be employed on the vehicle 80. This would enable one camera to produce a big-picture/macro view, while the other camera could zoom in on parts of the target.

Figure 2:
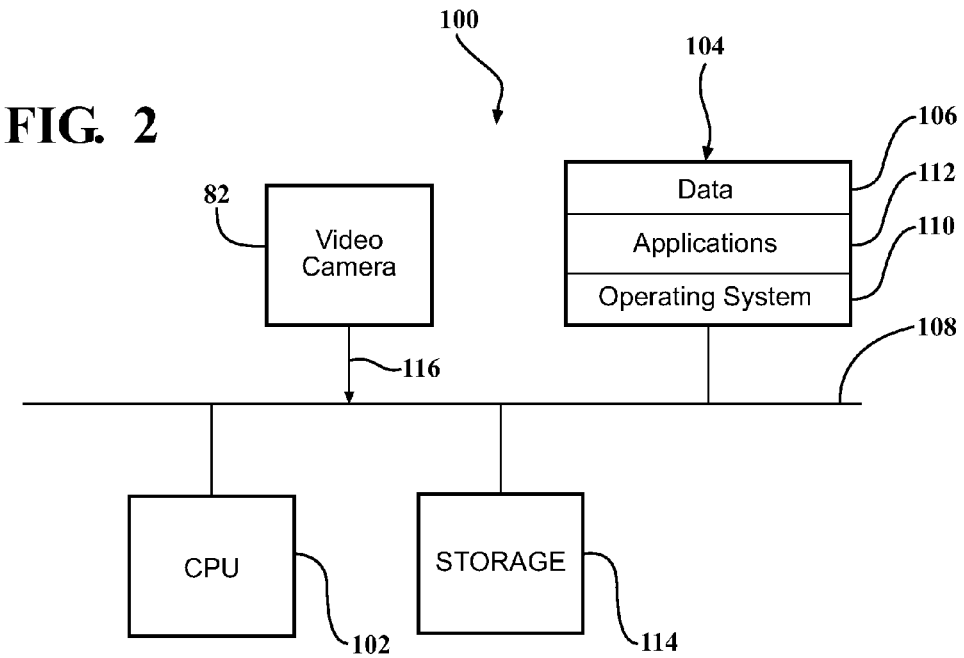
FIG. 2 is a block diagram of a computing device for implementing the disclosed method and forming part of the disclosed apparatus.

The apparatus, using the camera 82 and the control system described hereafter and shown in FIG. 2, detects objects 84, such as vehicle 84 described hereafter as a detected object by example, on a roadway 86 to the front, side or even, in some applications, to the rear of the vehicle 80 within the field of view of the camera 82 as indicated by arrow 88.

The method can be implemented by the apparatus which includes a computing device 100 shown in a block diagram form in FIG. 1. The computing device 100 can be any type of computing device, including a handheld, desktop, or other form of single computing device, or it can be formed of multiple computing devices. A CPU 102 in the computing device 100 can be a conventional central processing unit or any other type of device, or multiple devices, capable of manipulating or processing information. A memory 104 in the computing device 100 can be a Random Access Memory device (RAM) or any other suitable type of storage device.

The memory 104 can include data 106 that is accessed by the CPU 102 using a bus 108. The memory 104 can also include an operating system 110 and installed applications 112. The installed applications 112 include programs that permit the CPU 102 to perform the object tracking method described herein.

The computing device 100 can also include secondary, additional, or external storage 114, for example, a memory card, flash drive, or other forms of computer readable medium. The installed applications 112 can be stored in whole or in part in the secondary storage 114 and loaded into the memory 104 as needed for processing.

The computing device 100 can be mounted on the vehicle 80 or situated remote from the vehicle 80. In the latter case, remote communication will be used between the camera 82 and the computing device 100.

The computing device 100 receives an input in the form of sequential video frame image data 116 from the image sensor or camera 82 mounted on the vehicle 80. The video image data 116 may be stored in the memory 104 and/or the secondary storage 114.

Figure 3A:
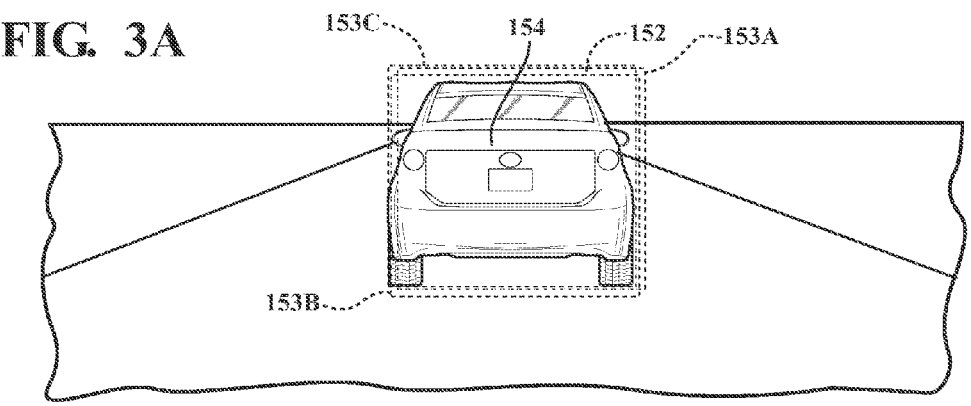
FIGS. 3A, 3B and 3C are examples of sequential images containing unblurred and blurred images.

Using a high definition output 116 from the camera 82, the target will have a reasonable size, as shown in FIG. 3A, to enable the segmentation of meaningful parts from the vehicle 84 with a reasonable size to implement tracking. For example, if a license plate is segmented as one part and tracked, the license plate can provide a unique identification of the vehicle 84 as long as it has enough resolution to be successfully tracked. As another example, many vehicles can be tracked by relying on their unique shapes or styling features, such as front grills, lights, manufacture logos, etc.

Figure 3B:
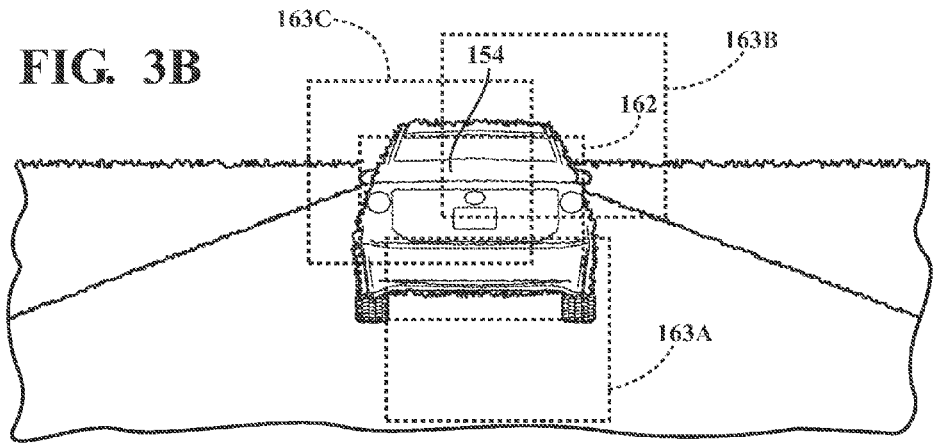
Figure 3C:
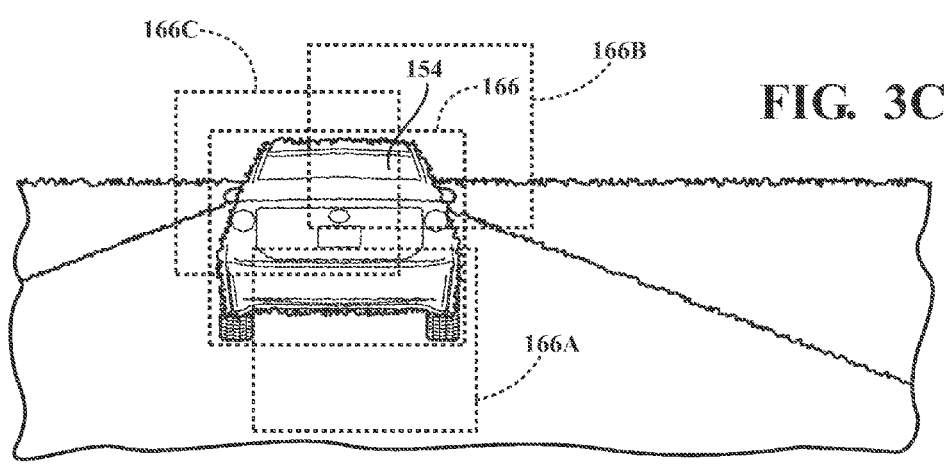
Figure 5:
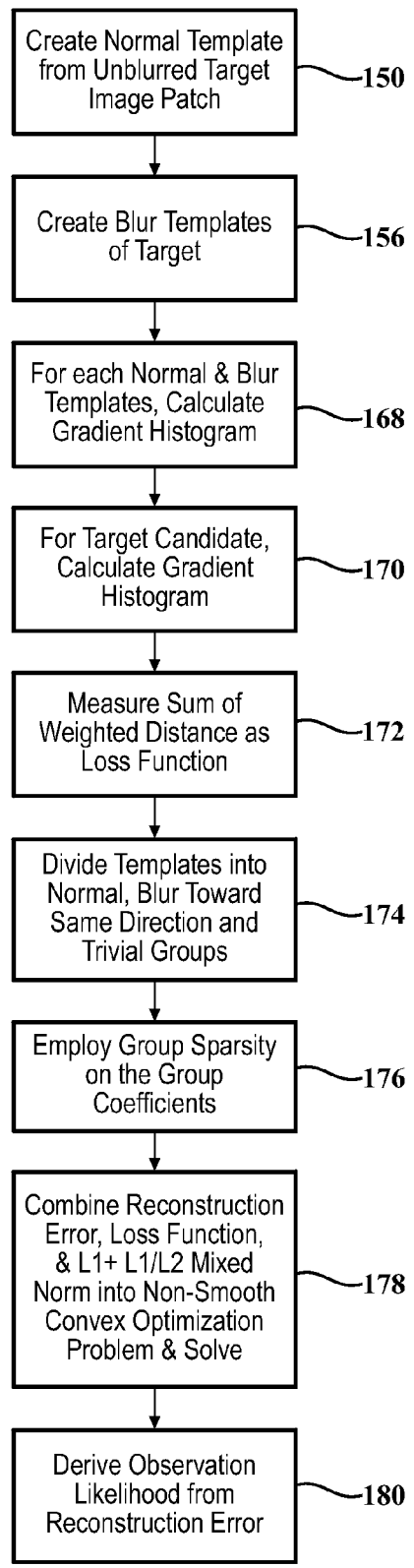
FIG. 5 is a detailed sequence diagram of the method and apparatus operation shown generally in FIG. 4.

In FIG. 3A, the object being tracked is illustrated as being a clear, non-blurred image. FIGS. 3B and 3C, which can be the next sequential images in a series of images received from camera 82, are illustrated as having blurred motion of the object.

In order to model the blur degradations, blur templates are incorporated into the appearance space. The appearance of the tracking target $y \in \mathbb{R}^d$ is represented by templates $T=[T_a, T_b, I]$, $$y = [T_a, T_b, I] \begin{bmatrix} a \\ b \\ e \end{bmatrix} \triangleq Tc, \quad s.t. \quad c_T \succeq 0 \quad (1)$$

Where $T_o=[t_1, \ldots, t_{n_a}] \in \mathbb{R}^{d \times n_a}$ contains $n_a$ normal templates, $T_b=[t_{1,1}, \ldots, t_{1,n_l}, \ldots, t_{n_\theta,1}, \ldots, t_{n_\theta,n_l}] \in \mathbb{R}^{d \times n_b}$ contains $n_b$ blur templates, I is the d×d identity matrix containing the trivial templates used for modeling image corruption. Accordingly $a=(a_1, a_2, \ldots, a_{n_a})^T \in \mathbb{R}^{n_a}$ and $b \in \mathbb{R}^{n_b}$ are called normal coefficients and blur coefficients respectively, $e=(e_1, e_2, \ldots, e_d)^T$ is called trivial coefficients, $c=[a^T, b^T, e^T]^T$ and $c_{\hat{T}}=[a^T, b^T]^T$.

The first normal template $t_1$ is obtained from the unblurred object patch of the target in the first frame, which is usually selected manually or by detection algorithms, other templates are shifted from it. Given a blur free patch of the target image, different blurred versions of the target can be modeled as convolving the normal target template with different kernels. In this framework, $t_{i,j}=t_1 \otimes k_{i,j}$ is the (i;j)$^{th}$ blur template, where $k_{i,j}$ is a Gaussian kernel that represents a 2D motion toward direction $\theta_i$ with magnitude $l_j$, where $\theta_i \in \Theta=\{\theta_1, \ldots, \theta_{n_\theta}\}$ and $l_j \in \mathcal{L}=\{l_1, \ldots, l_{n_l}\}$. Consequently, there are $n_b=n_\theta \times n_l$ blur templates. Based on the directions of the blur kernels, there are $b=[b_1^T, \ldots, b_{n_\theta}^T]^T \in \mathbb{R}^{n_b}$, where $b_i=(b_{i,1}, b_{i,2}, \ldots, b_{i,n_l})^T \in \mathbb{R}^{n_l}$ are the coefficients for the blur templates toward $i^{th}$ direction.

To use the estimated motion information from the sparse representation to guide the particle sampling process, estimated motion information from different sources are integrated into the proposal distribution, which is a combination of the first-order Markov transition $p(x_t|x_{t-1})$, the second-order Markov transition $p(x_t|x_{t-1}, x_{t-2})$, and $q_i(x_t|x_{t-1}, y_{t-1})$ the based on the blur motion estimation along direction $\theta_i$.

Incorporating blur templates into the appearance space allows for a more expressive appearance space to model blur degradations. However, with the augmented template space, ambiguity also increases, and some background might be well represented by some blur templates, especially when only grayscale information is used. In order to make the tracking algorithm more robust, based on the observation that though motion blur significantly changes the statistics of the gradients of the templates, the blur templates in the same direction have much more similar gradient histograms than blur templates of different directions, it is proposed to use the combination of the reconstruction error and a weighted sum of distances between the target candidate and each of the non-trivial templates as loss function.

For each template $T_{ab}=[T_a, T_b]$, its gradient histogram is calculated by letting each pixel vote for a gradient histogram channel, to get, $H=[h_1, h_2, \ldots, h_{n_a+n_b}] \in \mathbb{R}^{d_h \times (n_a+n_b)}$ where $d_h$ is the number of bins of the gradient histogram. Each $h_i$ is a gradient histogram from a normal or blur template. For the target candidate, its gradient histogram is calculated $g \in \mathbb{R}^{d_h}$, since the trivial templates are not considered when calculating the sum of weighted distance, $h=[\|h_1-g\|_1, \|h_2-g\|_1, \ldots, \|h_{n_a+n_b}-g\|_1] \in \mathbb{R}^{n_a+n_b d}$ indicate the distance between g and each element of H. $\|hc_{\hat{T}}\|_2^2$ used to measure the sum of the weighted distance, and $$\frac{1}{2}\|Tc - y\|_2^2 + \beta\|hc_{\hat{T}}\|_2^2 \quad (2)$$

is used as the loss function.

For the augmented template set with blur templates of different directions, since the motion blur of the target is always toward one direction at any time t, there is a natural group structure among the templates. The representation of the target candidate should not only be sparse, but also should have group structure, i.e., the coefficients should also be sparse at the group level. In our tracking framework, we divide the templates into $n_g=n_\theta+d+1$ groups $G=\{G_1, G_2, \ldots, G_{n_\theta+d+1}\}$ using the following scheme: the normal templates are in one group; the blur templates toward the same direction form a group; and each trivial template is an individual group. In order to capture the group information among the templates and achieve sparsity at the same time, we employ a structured sparsity inducing norm which combines the $l_1$ norm and a sum of $l_2$ norms over groups of variables. The mixed norm is known as "sparse group Lasso".

Combining the loss function (2) and the $l_1+l_1/l_2$ mixed norm results in the following non-smooth convex optimization problem:

$$\min_c \frac{1}{2}\|Tc - y\|_2^2 + \beta\|hc_{\hat{T}}\|_2^2 + \lambda_1\|c\|_1 + \lambda_2\sum_{i=1}^{n_g}\|c_{G_i}\|_2, \quad s.t. \quad c_T \succeq 0 \quad (3)$$

where $c_{G_i}$ are coefficients associated with $G_i$

Once the optimization problem Eq. (3) is solved, the observation likelihood can be derived from the reconstruction error of y as $p(y_t|x_t) \propto \exp\{-\alpha \|T_{ab}c_T - y\|_2^2\}$ where $\alpha$ is a constant used to control the shape of the Gaussian kernel.

Refer now to FIGS. 3A, 3B, 3C, 4 and 5, the method and steps performed by the apparatus will now be described.

The CPU 102 executes program instructions to follow the method described above to track an object across multiple sequential image frames where one or more of the image frames may include blurred motion of the object.

Figure 4:
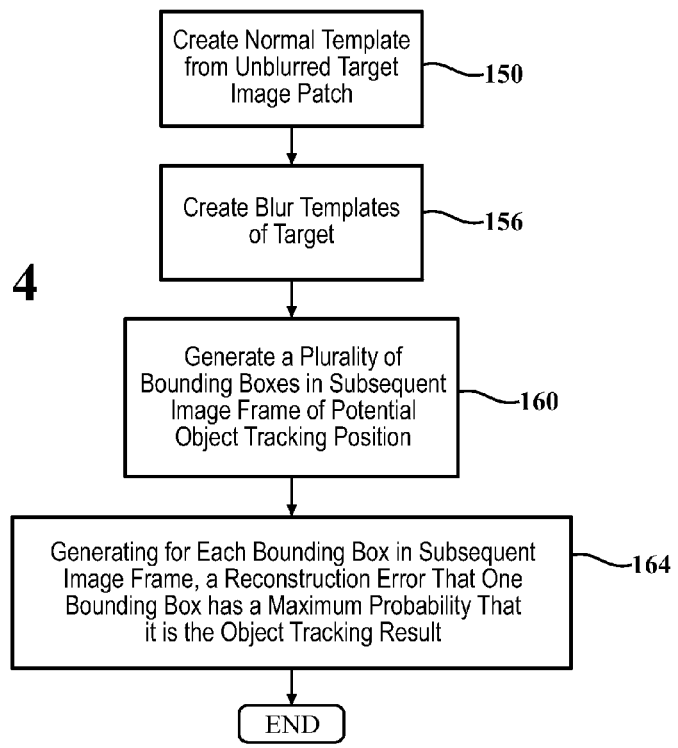
FIG. 4 is a sequence diagram showing the sequence of the method for operation of the apparatus according to the disclosure.

In step 150, FIG. 4 a normal target bounding box 152 is generated from the unblurred target image patch in FIG. 3A identifying the object or target 154. A plurality of templates 153A, 153B, and 153C are created in step 156, where each normal template 153A, 153B, and 153C is generated by convolving the normal template 152 with different Gaussian kernels.

Next, in step 160, the CPU 102 generates, for the next and for each subsequent image frame, such as the subsequent image frame shown in FIG. 3B, which, by example, contains blurred motion of the target object 162, a plurality of bounding boxes 163A, 163B, and 163C representing potential object tracking positions in the subsequent image frame shown in FIG. 3B are generated.

In step 164, which can contain numerous sub-steps described hereafter, the CPU 102 generates for each bounding box 163A, 163B, and 163C in the second sequential image frame 162 shown in FIG. 3B, or a third image frame 166 shown in FIG. 3C, a reconstruction error that one bounding box 163A, 163B, and 163C in the image frame has a maximum probability that it is the object tracking result.

Thus, for the subsequent image frame 162 shown in FIG. 3B, a plurality of bounding boxes 163A, 163B, and 163C, for example, are created representing potential object tracking positions of the object in the image frame 162. Each bounding box 163A-163C is positioned about the location of the target bounding box 152 from the preceding frame.

In step 168, for each bounding box 163A, 163B, and 163C, the CPU 102 calculates a gradient histogram h. Then, in step 170, the CPU 102, calculates a gradient histogram and the distance g from the target candidate bounding box histogram and the histograms of the normal and blur templates.

In step 172, the CPU 102 measures the sum of the weighted distance and loss function. Next in step 174, the CPU 102 divides the templates into groups of normal, blurred toward the same direction, and trivial template groups.

In step 176, the CPU 102 employs group sparsity on the coefficients of the each group of templates.

In step 178, the CPU 102 combines the reconstruction error of the loss function and the L1+L1/L2 mixed norm into a non-smooth convex optimization problem and solves the problem. In step 180, the output of the solved problem enables an observation likelihood from the reconstruction error that one bounding box which has a maximum probability is the object tracking result of the location of the target objector patch in the current image frame.

This bounding box defining the target object location in the second image shown in FIG. 3B is then used as the basis for the creation of the bounding boxes 166A, 166B, and 166C in the next sequential image shown in FIG. 3C. The same process described above is repeated to generate a reconstruction error that one of the bounding boxes 166A-166C has a maximum probability that it is the object tracking location or result in FIG. 3C.

This process is then repeated for each subsequent image thereby tracking the object across all of the sequential series of images despite any motion blur which may appear in any or all of the images.

Although the above object tracking method and apparatus for tracking an object over multiple blurred images has been described in conjunction with detecting an object relative to a moving vehicle, it will be understood that the present method and apparatus may be employed in other object tracking applications, such as facial recognition of pedestrians on a public street via a stationary camera, tracking any objects, besides vehicles, etc.

The above described blur tracker with group lasso object tracking method and apparatus provides a robust object detection despite multiple blurred recorded images from an image sensor or camera. The method and apparatus is computationally efficient, thereby allowing high-speed computation between sequential frames.

What is claimed is:

1. A method for tracking a target object in sequential frames of images comprising:
   determining a first tracking position associated with a target object in one frame of an image sequence;
   generating, by a processor, a plurality of normal templates about the first tracking position of the target object, and a plurality of blur templates;
   generating, by the processor, a plurality of bounding boxes about the first tracking position in a subsequent image frame of potential object tracking positions;
   combining a loss function and a $l_1 + l_1/l_2$ mixed norm; and
   generating, by the processor, for each of the plurality of bounding boxes surrounding a location of the target object in a subsequent image frame, a reconstruction error that one bounding box has a maximum probability that it is the target object tracking result.

2. The method of claim 1 further comprising:
   calculating a gradient histogram for the normal templates and the blur templates, and a gradient histogram of each bounding box.

3. The method of claim 2 further comprising;
   calculating a distance between the gradient histograms of each bounding box and the normal templates and the blur templates.

4. The method of claim 1 further comprising:
   using a sum of $l_1 + l_1/l_2$ mixed norms to regulate normal and blur templates coefficients.

5. The method of claim 1 further comprising:
   combining the loss function and the $l_1 + l_1/l_2$ mixed norm to find a minimum reconstruction error for a target object in one frame image.

6. A method for tracking objects comprising:
   receiving an image sequence including a plurality of sequential image frames from an image sensor;
   selecting a target object in one image frame;
   segmenting the target object into a bounding box;
   creating a plurality of a normal templates about the bounding box;
   creating a plurality of blur templates of the bounding box by convolving the bounding box with different kernels;
   for the normal templates and the blur templates in one image frame, calculating a gradient histogram;
   in the next image frame, generating, by a processor, a plurality of target candidate bounding boxes about the bounding box in a preceding image frame;
   for each bounding box, calculating a gradient histogram and a distance of each target candidate bounding box gradient histogram and the gradient histograms of the normal templates and the blur templates;

measuring a sum of weighted distance and a loss function;

dividing the templates into separate groups of: normal templates, blur templates toward a same direction of motion, and trivial templates;

using a structured sparsity-inducing norm that combines a sum of $l_1+l_1/l_2$ over groups of variables in each group of normal templates and blur templates;

combining a loss function and the sum of $l_1+l_1/l_2$ mixed norms into a non-smooth convex optimization problem; and solving the non-smooth convex optimization problem to derive an observation likelihood from a reconstruction error of a location of the target object being tracked in a current image frame.

7. An apparatus for tracking objects over a plurality of sequential image frames, where at least certain of the sequential image frames contain motion blur, the apparatus comprising:

an image sensor generating a plurality of sequential image frames of a target object in a field of view of the image sensor, the image sensor outputting the sequential image frames; and a processor configured to receive an image sequence including a plurality of sequential image frames from the image sensor, the processor executing program instructions to:

determine a first tracking position associated with a target object in a first image frame;

determine a plurality of normal templates about the first tracking position of the target object and a plurality of blur templates associated with the normal templates;

generate a plurality of bounding boxes in a subsequent frame of potential object tracking positions about the first tracking position in a preceding image frame;

combine a loss function and a $l_1+l_1/l_2$ mixed norm; and generate a reconstruction error that one of the plurality of bounding boxes has a maximum probability that it is the object tracking position.

8. The apparatus of claim 7 wherein the program instructions further comprise an instruction for:

calculating, by the processor, a gradient histogram for the normal and blurred templates.

9. The apparatus of claim 8 wherein the program instructions further comprise an instruction for:

calculating, by the processor, a distance between a gradient histogram of a bounding box of the target object and the gradient histogram of normal templates and blur template.

10. The apparatus of claim 7 wherein the program instructions further comprise an instruction for:

using a sum of $l_1+l_1/l_2$ mixed norms to regulate normal and blur templates coefficients.

11. The apparatus of claim 7 wherein the program instructions further comprise an instruction for:

combining, by the processor, a loss function and the $l_1+l_1/l_2$ mixed norm to find a minimum reconstruction error for a target candidate in one image frame.

12. The apparatus of claim 7 wherein the program instructions further comprise instructions for:

selecting a target image in one image frame;

segmenting the target image into a target-bounding box;

creating the plurality of normal templates of an unblurred object in the target box;

creating a plurality of blur templates from the normal templates by convolving the normal templates with different kernels;

calculating a gradient histogram for the plurality of normal templates and the blur templates;

in a next image frame, generating a plurality of target candidate bounding boxes about a target object in a preceding image frame;

calculating a distance of each target candidate gradient histograms and the gradient histograms of the normal and blur templates;

measuring a sum of weighted distance and a loss function;

dividing the templates into separate groups of: normal templates, blur templates toward a same direction of motion, and trivial templates;

using a structured sparsity-inducing norm that combines a sum of $l_1+l_1/l_2$ over groups of variables in each group of normal templates and blur templates;

combining a loss function and the sum of $l_1+l_1/l_2$ mixed norm into a non-smooth convex optimization problem; and solving the non-smooth convex optimization problem to derive an observation likelihood from a reconstruction error having a maximum probability that one bounding box of a location is the location of the object being tracked in a current image frame.

* * * * *